US008471411B2

(12) United States Patent
Urano

(10) Patent No.: US 8,471,411 B2
(45) Date of Patent: Jun. 25, 2013

(54) WIRELESS POWER FEEDER, WIRELESS POWER TRANSMISSION SYSTEM, AND TABLE AND TABLE LAMP USING THE SAME

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 310 days.

(21) Appl. No.: 12/909,482

(22) Filed: Oct. 21, 2010

(65) Prior Publication Data

US 2011/0095619 A1   Apr. 28, 2011

(30) Foreign Application Priority Data

Oct. 28, 2009   (JP) ................. 2009-247537
Aug. 25, 2010   (JP) ................. 2010-187790

(51) Int. Cl.
*H01F 27/42*   (2006.01)
(52) U.S. Cl.
USPC ....................................... 307/104
(58) Field of Classification Search
USPC ....................................... 307/104
See application file for complete search history.

(56) References Cited

U.S. PATENT DOCUMENTS

| 6,807,071 B1 | 10/2004 | Zhang et al. |
| 7,529,105 B1 | 5/2009 | Choi et al. |
| 2007/0222542 A1 | 9/2007 | Joannopoulos et al. |
| 2008/0136341 A1 | 6/2008 | Araki et al. |
| 2008/0278264 A1 | 11/2008 | Karalis et al. |
| 2009/0015075 A1 | 1/2009 | Cook et al. |
| 2009/0072629 A1 | 3/2009 | Cook et al. |
| 2009/0079269 A1* | 3/2009 | Jin ................. 307/104 |
| 2009/0127937 A1 | 5/2009 | Widmer et al. |
| 2010/0225271 A1 | 9/2010 | Oyobe et al. |
| 2011/0285212 A1* | 11/2011 | Higuma et al. ............ 307/104 |

FOREIGN PATENT DOCUMENTS

| JP | 2006-230032 | 8/2006 |
| JP | 2008-172872 | 7/2008 |
| WO | WO 2006/022365 A1 | 3/2006 |
| WO | WO 2009/054221 A1 | 4/2009 |

OTHER PUBLICATIONS

Jin-ho choi et al., "The Improved Burst Mode in the stand-by operation of Power Supply," pp. 426432, IEEE, 2004.
European Search Report issued in European Patent Application No. EP 10014085.4 dated Feb. 8, 2011.

* cited by examiner

*Primary Examiner* — Daniel Cavallari
(74) *Attorney, Agent, or Firm* — McDermott Will & Emery LLP

(57) ABSTRACT

Power is fed from a feeding coil to a receiving coil by magnetic resonance. A drive circuit outputs an IN signal generated by an oscillator as a DR signal to alternately turn ON/OFF switching transistors at a resonance frequency, whereby AC current is fed to the feeding coil, and then the AC current is fed from the feeding coil to the receiving coil. An enable signal generation circuit generates an EN signal at a frequency lower than the resonance frequency. The drive circuit outputs the DR signal only while the EN signal assumes a high level. Transmission power from a wireless feeder to a wireless receiver is controlled by adjusting the duty ratio of the EN signal.

6 Claims, 7 Drawing Sheets

WIRELESS POWER FEEDER, WIRELESS POWER TRANSMISSION SYSTEM, AND TABLE AND TABLE LAMP USING THE SAME

BACKGROUND OF THE INVENTION

1. Field of the Invention

The present invention relates to a wireless AC power feeding and, more particularly, to power control thereof.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range of several centimeters. The type (B) utilizing radio wave is available in a long range; however, it cannot feed big electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, large current flows in the receiving coil. At this time, current also flows in the loading coil according to the principle of electromagnetic induction, and power is taken out from a load R connected in series to the loading coil. By utilizing the magnetic field resonance phenomenon, high power transmission efficiency can be achieved even if the feeding coil and receiving coil are largely spaced from each other.

CITATION LIST

Patent Document

[Patent Document 1] U.S. Patent Application Publication No. 2008/0278246

[Patent Document 2] Jpn. Pat. Appln. Laid-Open Publication No. 2006-230032

[Patent Document 3] International Publication No. WO2006/022365

[Patent Document 4] U.S. Patent Application Publication No. 2009/0072629

[Patent Document 5] U.S. Patent Application Publication No. 2009/0015075

[Patent Document 6] Jpn. Pat. Appln. Laid-Open Publication No. 2008-172872

SUMMARY

The present inventor considers that a mechanism for controlling the magnitude of transmission power is required in order to extend the applicability of wireless power feeding. However, in the present situation, there has been no such approach.

In the technique disclosed in Patent Document 2, a DC power supply V1 is used as an input voltage supply to generate transmission power. Although not described in Patent Document 2, it can be considered possible to control the magnitude of transmission power by controlling input voltage using a DC/DC converter. However, in general, power loss of about 10 to 20% occurs in the DC/DC converter. Further, the use of the DC/DC converter is not favorable in terms of cost.

A main object of the present invention is to effectively control transmission power in wireless power feeding of a magnetic field resonance type.

A wireless power feeder according to the present invention is a device for feeding power by wireless from a feeding coil to a receiving coil at the resonance frequency of the feeding coil and receiving coil. The wireless power feeder includes: a power transmission control circuit that feeds AC power to the feeding coil at the resonance frequency; a feeding coil circuit that includes the feeding coil and a capacitor and resonates at the resonance frequency; a control signal generation circuit that generates a control signal having a control frequency lower than the resonance frequency; and a comparison circuit that generates an enable signal when a predetermined magnitude relationship is established between the level of the control signal and that of a predetermined reference signal. The power transmission control circuit feeds the AC power to the feeding coil under only while the enable signal is being generated.

The "predetermined magnitude relationship" may be that the level of the control signal is higher than that of the reference signal, or vice versa. According to such an embodiment, the enable signal can be generated, for example, only when the level of the control signal is higher than a predetermined level, and wireless power feeding is executed only while the enable signal is being generated. The time ratio between the power feeding execution time and power feeding dormant time changes depending on the level of the reference signal, thus making it easy to arbitrarily adjust the magnitude of transmission power. Adoption of time control method makes power loss hardly occur.

The control signal generation circuit may generate a signal having a saw-tooth waveform as the control signal. The wireless power feeder may further include a reference signal adjustment circuit for adjusting the level of the reference signal.

The wireless power feeder may further include an exciting coil that is magnetically coupled to the feeding coil and feeds AC power fed from the power transmission control circuit to the feeding coil. The power transmission control circuit may include first and second current paths and make first and second switches connected in series respectively to the first and second current paths alternately conductive to feed the AC power to the exciting coil.

A wireless power transmission system according to the present invention includes: the abovementioned wireless power feeder; the receiving coil; and a loading coil that is magnetically coupled to the receiving coil and receives power that the receiving coil has received from the feeding coil.

A table with wireless power feeding function according to the present invention may include the abovementioned wireless power feeder. The feeding coil is provided on the rear surface of the table or incorporated inside the table. According to such an embodiment, it is possible to add a wireless power feeding function while maintaining the outer appearance of a commonly-used table.

A table lamp with wireless power receiving function according to the present invention receives, using a receiving coil, AC power transmitted from the abovementioned table by wireless. The table lamp includes: a receiving coil circuit that includes the receiving coil and a capacitor and resonates at the resonance frequency of the feeding coil; and a loading circuit that includes a loading coil that is magnetically coupled to the receiving coil to receive the AC power from the receiving coil and a lamp that receives power from the loading coil. When the lamp is placed on the table, the receiving coil receives the AC power fed from the feeding coil provided in the table to turn on the lamp. This configuration eliminated the need of providing a power cord, thus being advantageous in terms of appearance and safety.

It is to be noted that any arbitrary combination of the above-described structural components and expressions changed between a method, an apparatus, a system, etc. are all effective as and encompassed by the present embodiments.

According to the present invention, it is possible to easily perform control of transmission power in wireless power feeding of a magnetic field resonance type.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

A preferred embodiment of the present invention will be described below with reference to the accompanying drawings.

Figure 1:
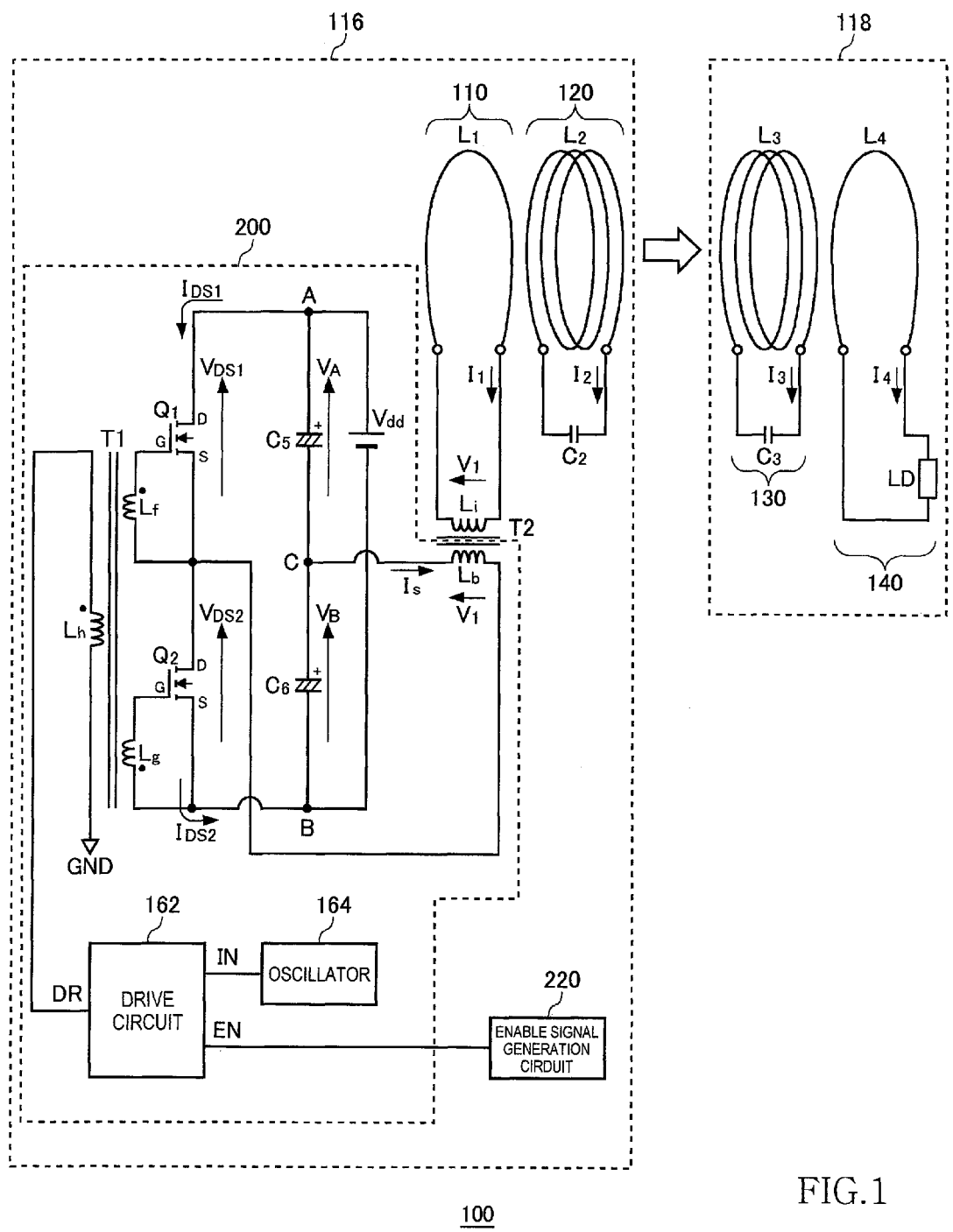
FIG. 1 is a system configuration view of a wireless power transmission system.

FIG. 1 is a system configuration view of a wireless power transmission system 100. The wireless power transmission system 100 includes a wireless power feeder 116 and a wireless power receiver 118. The wireless power feeder 116 includes, as basic components, a power transmission control circuit 200, an exciting circuit 110, a feeding coil circuit 120, and enable signal generation circuit 220. The wireless power receiver 118 includes a receiving coil circuit 130, and a loading circuit 140.

A distance of about 0.2 to 1.0 m is provided between a feeding coil L2 of the feeding coil circuit 120 and a receiving coil L3 of the receiving coil circuit 130. The wireless power transmission system 100 mainly aims to feed AC power from the feeding coil L2 to receiving coil L3 by wireless. The wireless power transmission system 100 according to the present embodiment is assumed to operate at a resonance frequency fr of 100 kHz or less. In the present embodiment, a resonance frequency fr is set to 100 kHz. Note that the wireless power transmission system 100 according to the present embodiment can operate in a high-frequency band such as ISM (Industry-Science-Medical) frequency band.

The exciting circuit 110 is a circuit in which an exciting coil L1 and a transformer T2 secondary coil Li are connected in series. The transformer T2 secondary coil Li constitutes a coupling transformer T2 together with a transformer T2 primary coil Lb and receives AC power from the power transmission control circuit 200 by electromagnetic induction. The number of windings of the exciting coil L1 is 1, diameter of a conductive wire is 5 mm, and shape of the exciting coil L1 itself is a square of 210 mm×210 mm. In FIG. 1, the exciting coil L1 is represented by a circle for clarification. Other coils are also represented by circles for the same reason. All the coils illustrated in FIG. 1 are made of copper. Current I1 flowing in the exciting circuit 110 is AC.

The feeding coil circuit 120 is a circuit in which a feeding coil L2 and a capacitor C2 are connected in series. The exciting coil L1 and feeding coil L2 face each other. The distance between the exciting coil L1 and feeding coil L2 is as comparatively small as 10 mm or less. Thus, the exciting coil L1 and feeding coil L2 are electromagnetically strongly coupled to each other. The number of windings of the feeding coil L2 is 7, diameter of a conductive wire is 5 mm, and shape of the feeding coil L2 itself is a square of 280 mm×280 mm. When the AC current I1 is made to flow in the exciting coil L1, an electromotive force occurs in the feeding coil L2 according to the principle of electromagnetic induction to cause AC current I2 to flow in the feeding coil circuit 120. The AC current I2 is considerably larger than the AC current I1. The values of the feeding coil L2 and capacitor C2 are set such that the resonance frequency fr of the feeding coil circuit 120 is 100 kHz.

The receiving coil circuit 130 is a circuit in which a receiving coil L3 and a capacitor C3 are connected in series. The feeding coil L2 and receiving coil L3 face each other. The number of windings of the receiving coil L3 is 7, diameter of a conductive wire is 5 mm, and shape of the receiving coil L3 itself is a square of 280 mm×280 mm. The values of the receiving coil L3 and capacitor C3 are set such that the resonance frequency fr of the receiving coil circuit 130 is also 100 kHz. Thus, the feeding coil L2 and receiving coil L3 need not have the same shape. When the feeding coil L2 generates a magnetic field at the resonance frequency fr=100 kHz, the feeding coil L2 and receiving coil L3 magnetically resonate, causing large current I3 to flow in the receiving coil circuit 130.

The loading circuit 140 is a circuit in which a loading coil L4 and a load LD are connected in series. The receiving coil L3 and loading coil L4 face each other. The distance between the receiving coil L3 and loading coil L4 is as comparatively small as about 10 mm or less. Thus, the receiving coil L3 and loading coil L4 are electromagnetically strongly coupled to each other. The number of windings of the loading coil L4 is 1, diameter of a conductive wire is 5 mm, and shape of the loading coil L4 itself is a square of 300 mm×300 mm. When the current I3 is made to flow in the receiving coil L3, an electromotive force occurs in the loading circuit 140 to cause current I4 to flow in the loading circuit 140. The AC power fed from the feeding coil L2 of the wireless power feeder 116 is received by the receiving coil L3 of the wireless power receiver 118 and taken from the load LD.

If the load LD is connected in series to the receiving coil circuit 130, the Q-value of the receiving coil circuit 130 is degraded. Therefore, the receiving coil circuit 130 for power reception and loading circuit 140 for power extraction are separated from each other. In order to enhance the power transmission efficiency, the center lines of the feeding coil L2, receiving coil L3, and loading coil L4 are preferably made to coincide with one another.

A configuration of the power transmission control circuit 200 will be described. The power transmission control circuit 200 is an electronic circuit of a half-bridge type. A drive circuit 162 is connected to the primary side of a gate drive transformer T1. As the drive circuit 162, which is a known circuit, an IC (Integrated Circuit) having product serial number UCC37321 manufactured by Texas Instruments Inc. can be used. An oscillator 164 and an enable signal generation circuit 220 are connected to the drive circuit 162.

The oscillator 164 generates an IN signal (original signal) at a predetermined drive frequency. The drive frequency is assumed to be 100 kHz, which is equal to the resonance frequency. Although the waveform of the IN signal may be a sine wave, it is assumed here that the waveform of the IN signal is a rectangular wave (digital waveform). The IN signal generated by the oscillator 164 is input to the drive circuit 162 as IN-input.

The enable signal generation circuit 220 generates an EN signal (enable signal) at a control frequency lower than the drive frequency. The control frequency in the present embodiment is 1.0 kHz. The EN signal has a rectangular waveform (digital waveform). The EN signal generated by the enable signal generation circuit 220 is input to the drive circuit 162 as EN-input. The details of the enable signal generation circuit 220 will be described later using FIG. 2.

The drive circuit 162 outputs the IN signal (original signal) of 100 kHz as a DR signal (drive signal) only for a time period (hereinafter, referred to as "enable period") during which the EN signal of 1.0 kHz assumes a high level. For a time period (hereinafter, referred to as "disable period") during which the EN signal assumes a low level, the DR signal is fixed to zero. In the enable period, the DR signal of 100 kHz is supplied, so that current flows in a transfer T1 primary coil Lh alternately in both positive and negative directions. The transformer T1 primary coil Lh, a transformer T1 secondary coil Lf, and a transfer T1 secondary coil Lg constitute the gate drive coupling transformer T1. Electromagnetic induction causes current to flow also in the transformer T1 secondary coil Lf and transformer T1 secondary coil Lg alternately in both positive and negative directions. The drive circuit 162 and gate drive transformer T1 control power transmission from the power feeding coil circuit 120 to the receiving coil circuit 130 and the like as a drive system of the transmission control circuit 200.

One end of the transformer T1 secondary coil Lf is connected to the gate of a switching transistor Q1, and the other end of the transformer T1 secondary coil Lf is connected to the source of a switching transistor Q1. One end of the transformer T1 secondary coil Lg is connected to the gate of a switching transistor Q2, and the other end of the transformer T1 secondary coil Lg is connected to the source of a switching transistor Q2. When the DR signal of 100 kHz is supplied during the enable period, voltage Vx (Vx>0) is alternately applied, at 100 kHz, to the gates of the switching transistors Q1 and Q2. As a result, the switching transistors Q1 and Q2 are alternately turned on/off at the drive frequency fo. The switching transistors Q1 and Q2 are enhancement type MOSFET (Metal Oxide Semiconductor Field effect transistor) having the same characteristics but may be other transistors such as a bipolar transistor. Further, other switches such as a relay switch may be used in place of the transistor.

A capacitor C5 is connected between points A and C of FIG. 1, and a capacitor C6 is connected between points C and B of FIG. 1. These capacitors are charged by DC voltage of a DC power supply Vdd. Assuming that the voltage (voltage between points A and C) of the capacitor C5 is VA, voltage (voltage between points C and B) of the capacitor C6 is VB, VA+VB (voltage between points A and B) represents input voltage Vin. That is, the capacitors C5 and C6 each function as a DC voltage supply.

The drain of the switching transistor Q1 is connected to the positive electrode of the capacitor C5. The negative electrode of the capacitor C5 is connected to the source of the switching transistor Q1 through the transformer T2 primary coil Lb. The source of the switching transistor Q2 is connected to the negative electrode of the capacitor C6. The positive electrode of the capacitor C6 is connected to the drain of the switching transistor Q2 through the transformer T2 primary coil Lb.

Voltage between the source and drain of the switching transistor Q1 is referred to as source-drain voltage VDS1, and voltage between the source and drain of the switching transistor Q2 is referred to as source-drain voltage VDS2. Current flowing between the source and drain of the switching transistor Q1 is referred to as source-drain current IDS1, and current flowing between the source and drain of the switching transistor Q2 is referred to as source-drain current IDS2. The directions of arrows in the diagram indicate the positive directions, and directions opposite to the directions of the arrows indicate the negative directions.

When the switching transistor Q1 is turned conductive (ON), the switching transistor Q2 is turned non-conductive (OFF). A main current path (hereinafter, referred to as "first current path") at this time extends from the positive electrode of the capacitor C5, passes through the point A, switching transistor Q1, transformer T2 primary coil Lb, and point C in this order, and returns to the negative electrode of the capacitor C5. The switching transistor Q1 functions as a switch for controlling conduction/non-conduction of the first current path.

When the switching transistor Q2 is turned conductive (ON), the switching transistor Q1 is turned non-conductive (OFF). A main current path (hereinafter, referred to as "second current path") at this time extends from the positive electrode of the capacitor C6, passes through the point C, transformer T2 primary coil Lb, switching transistor Q2, and point B in this order, and returns to the negative electrode of the capacitor C6. The switching transistor Q2 functions as a switch for controlling conduction/non-conduction of the second current path.

Current flowing in the transformer T2 primary coil Lb in the power transmission control circuit 200 is referred to as "current IS". The current IS is AC current, and the current flow in a first current path is defined as the positive direction and current flow in a second current path is defined as the negative direction.

In the enable period, the IN signal that the oscillator 164 supplies at the drive frequency equal to the resonance frequency directly serves as the DR signal, so that the first and second current paths are alternately switched at the resonance frequency. Since AC current Is of the resonance frequency flows in the transformer T2 primary coil Lb, AC current I1 flows in the exciting circuit 110 at the resonance frequency, and AC current I2 of the resonance frequency flows in the feeding coil circuit 120. Thus, the feeding coil L2 of the feeding coil circuit 120 and capacitor C2 are in a resonance state. The receiving coil circuit 130 is also a resonance circuit of the same resonance frequency, so that the feeding coil L2 and receiving coil L3 magnetically resonate. At this time, the maximum transmission efficiency can be obtained.

Assume that the number of windings of the transformer T2 primary coil Lb is N1 and number of windings of the transformer T2 secondary coil Li is N2. An AC magnetic field generated by the AC current Is of the transformer T2 primary coil Lb causes inductive current I1 having the same phase as that of the AC current Is to flow in the transformer T2 secondary coil Li. The coupling transformer T2 is, e.g., a small transformer (toroidal, EE-type, EI-type, etc.) using a ferrite core. The magnitude of the current I1 is $Is \cdot (N1/N2)$ according to the law of equal ampere-turn. The relationship between the voltage V2 of the transformer T2 secondary coil Li and voltage V1 of the transformer T2 primary coil Lb is represented by $V2=V1 \cdot (N2/N1)$. In the present embodiment, $N1>N2$ is established. Therefore, the voltage V1 is reduced to voltage V2 by the coupling transformer T2. By adjusting the winding number ratio between N1 and N2, the magnitude of the voltage V2 to be fed to the exciting circuit 110 can be adjusted.

Figure 2:
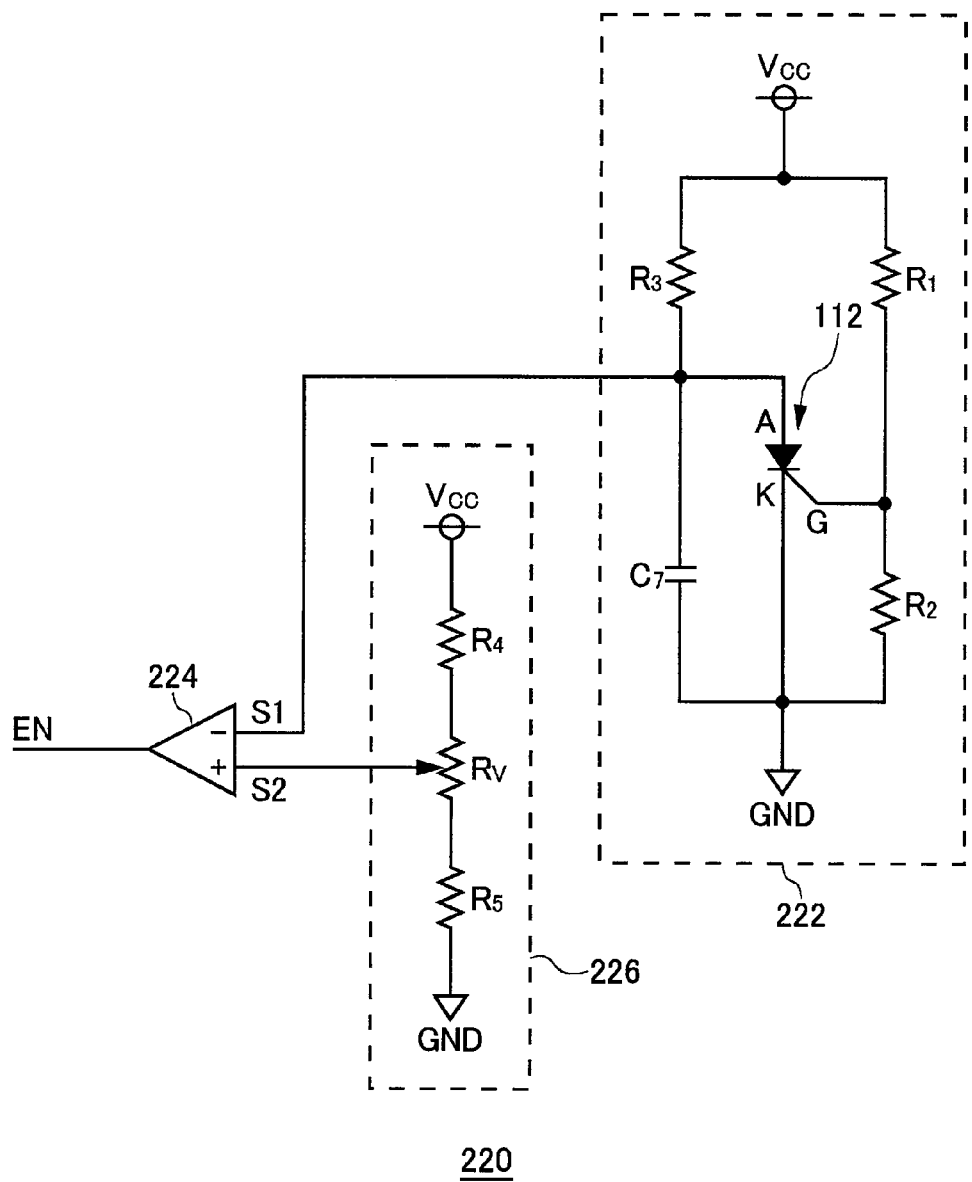
FIG. 2 is a circuit diagram of an enable signal generation circuit.

FIG. 2 is a circuit diagram of the enable signal generation circuit 220. The enable signal generation circuit 220 includes a control signal generation circuit 222, a comparison circuit 224, and a reference signal adjustment circuit 226. An S1 signal (control signal) which is an output of the control signal generation circuit 222 is input to the negative terminal of the comparison circuit 224, and an S2 signal (reference signal) which is an output of the reference signal adjustment circuit 226 is input to the positive terminal of the comparison circuit 224.

The control signal generation circuit 222 generates, as the S1 signal, AC voltage of a saw-tooth waveform at the control frequency of 1.0 kHz. The control signal generation circuit 222 includes resistors R1 to R3, a capacitor C7, and a thyristor 112. Gate voltage VG obtained by divining power supply voltage of a power supply VCC by the resistors R1 and R2 is applied to the gate G of the thyristor 112. The gate voltage VG is a fixed value. The anode A of the thyristor 112 is connected to the power supply VCC and the ground through the resistor R3 and capacitor C7, respectively. The power supply voltage is reduced across the resistor R3 and thereby anode potential VA is applied to the thyristor 112. The S1 signal represents this anode potential VA.

When the anode potential VA is not higher than the gate voltage VG, electric conduction is not provided between the anode and cathode of the thyristor 112, and the capacitor C7 is charged during this period. In accordance with charging of the capacitor C7, the anode potential VA (S1 signal) is increased and, when the anode potential VA becomes higher than the gate potential VG, electric conduction is provided between the anode and cathode of the thyristor 112. At this time, the electrical charge of the capacitor C7 is discharged through the thyristor 112, with the result the anode potential VA becomes not higher than gate voltage VG once again. The control signal generation circuit 222 repeats the above process at 1.0 kHz (control frequency). As a result, the S1 signal of a saw-tooth waveform is generated as described later in FIG. 3. The control frequency is determined by the time constants of the capacitor C7 and resistor R3. In the present embodiment, the control signal S1 changes in a range of 0.6 (V) to 3.0 (V) kHz (hereinafter, referred to as "control voltage range").

The reference signal adjustment circuit 226 is a circuit including resistors R4 and R5 and a variable resistor Rv. The power supply VCC is connected to the ground through a series resistor circuit including the resistor R4, variable resistor Rv, and resistor R5. The S2 signal is a fixed value signal representing mid-potential of the variable resistor Rv. The level of the S2 signal can be changed by adjusting the variable resistor Rv. The reference signal adjustment circuit 226 generates fixed voltage as the S2 signal. In the present embodiment, the S2 signal is adjusted in a range of 0.5 (V) to 3.1 (V) (hereinafter, referred to as "reference voltage range"). That is, the reference voltage range encompasses the control voltage range.

The comparison circuit 224 outputs a high-level EN signal when the level of the S2 signal is higher than that of the S1 signal while it outputs a low level EN signal in the rest of the time. In other words, the period during which the level of the S2 signal is higher than that of the S1 signal is the enable period, and the rest of the time period is the disable period.

Figure 3:
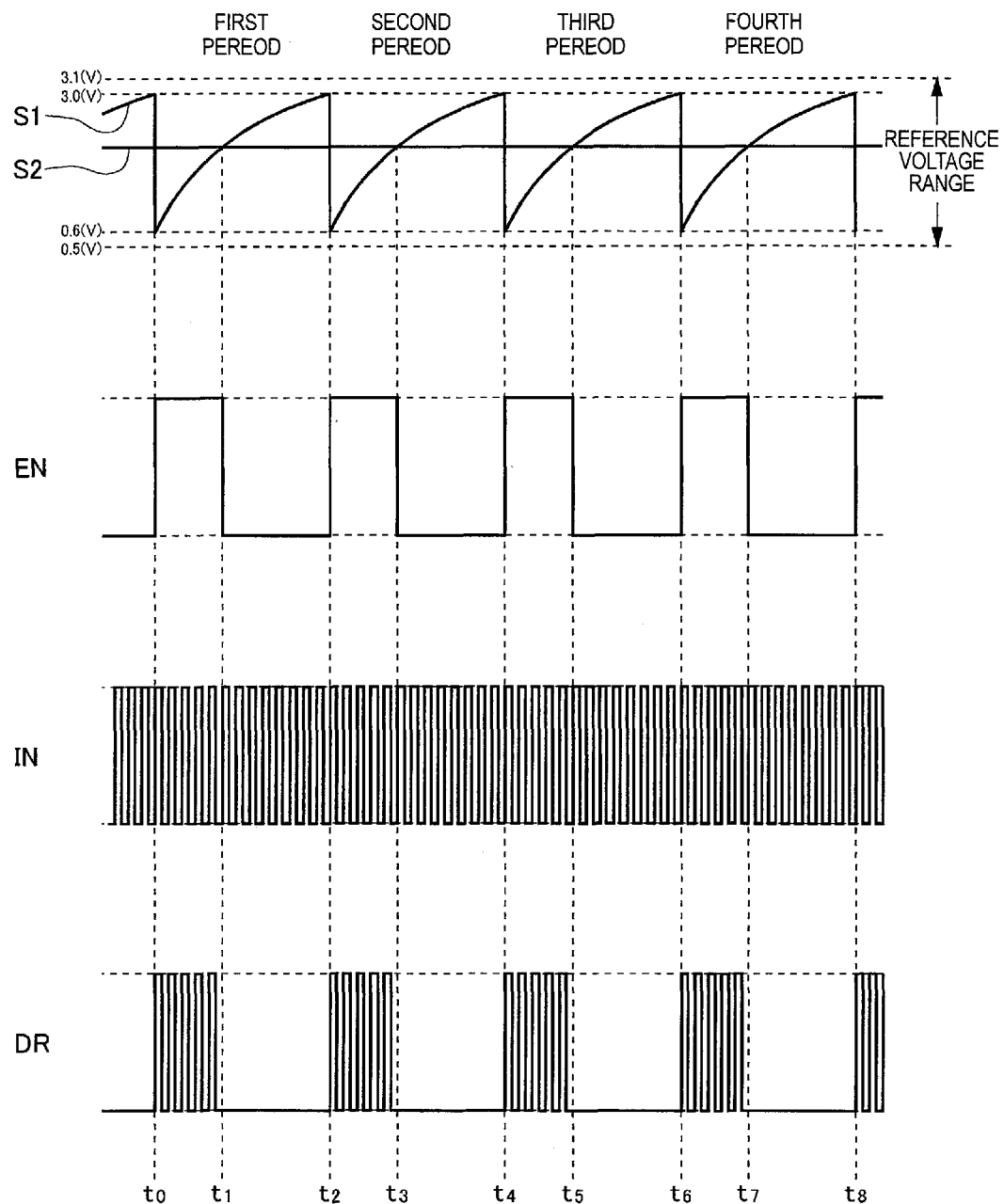
FIG. 3 is a time chart illustrating the voltage/current changing process.

FIG. 3 is a time chart illustrating the voltage/current changing process. In the control signal generation circuit 222, charging of the capacitor C7 is started at time t0. The anode potential VA is gradually increased and, accordingly, the level of the S1 signal is gradually increased. At time t2, the anode potential VA becomes higher than the gate potential VG, and electric conduction is provided between the anode and cathode of the thyristor 112. Since the capacitor C7 discharges its electrical charge, the anode potential VA (S1 signal) is abruptly reduced from the highest value of 3.0 (V) to lowest value of 0.6(V). The time period from time t0 to time t2 is referred to as "first period". Similarly, the time period from time t2 to time t4 is referred to as "second period", the time period from time t4 to time t6 is referred to as "third period", and the time period from time t6 to time t8 is referred to as "fourth period". Since the control frequency is 1.0 kHz, the length of each of the first to fourth period is 1.0 (msec).

The comparison circuit 224 compares the levels of the S1 and S2 signals and generates a high level EN signal when the level of the S2 signal is higher than that of the S1 signal while it generates a low level EN signal when the level of the S2 signal is not higher than that of the S1 signal. In the case of the first period illustrated in FIG. 3, the EN signal assumes a high level during time t0 to time t1 and assumes a low level during time t1 to time t2. That is, during the first period (time t1 to time t2), the time period from t0 to t1 is the enable period, and time period from time t1 to t2 is the disable period. By adjusting the level of the S2 signal, the duty ratio between the enable and disable periods can be adjusted. The same can be said for the second and subsequent periods.

The oscillator 164 continually generates the IN signal having a rectangular waveform at the drive frequency (=resonance frequency=100 kHz). The drive circuit 162 passes the IN signal as the DR signal during the enable period (time t0 to time t1) while it fixes the DR signal to a low level during the disable period (time t1 to time t2). As a result, the DR signal of the resonance frequency (=100 kHz) is supplied only during the enable period (time t0 to time t1).

Figure 4:
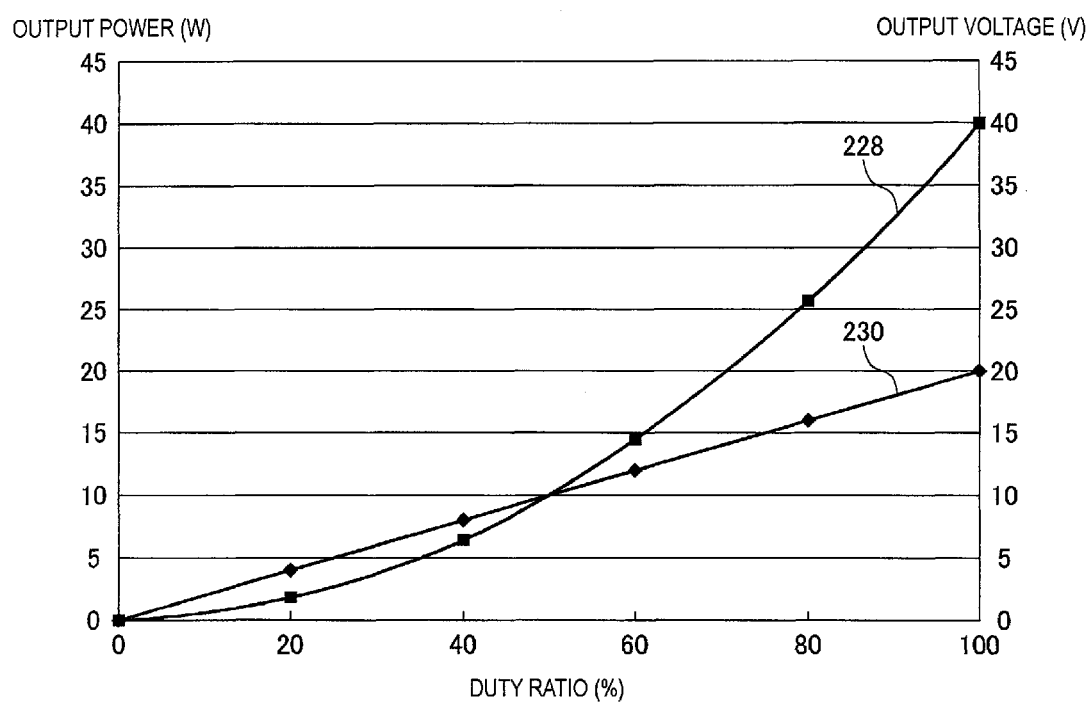
FIG. 4 is a graph illustrating a relationship between the duty ratio and output.

FIG. 4 is a graph illustrating a relationship between the duty ratio and output. The horizontal axis represents duty ratio (%), the left vertical axis represents output power (W), and right vertical axis represents output voltage (V). A load LD is assumed to be 20 (Ω). Further, it is assumed that when the duty ratio is 100(%), that is, when the EN signal assumes a high level on a steady basis, the effective value (output voltage) of voltage measured from the load LD be 20 (V) and effective value (output voltage) of AC current I4 flowing in the load LD be 2.0 (A). In this case, output power P=output voltage V×output current I=40 (W) is established.

An output power characteristic 228 represents a relationship between the duty ratio and output power. An output voltage characteristic 230 represents a relationship between the duty ratio and output voltage. As illustrated in FIG. 4, the output power and output voltage are each a monotonically increasing function of the EN signal.

Figure 5:
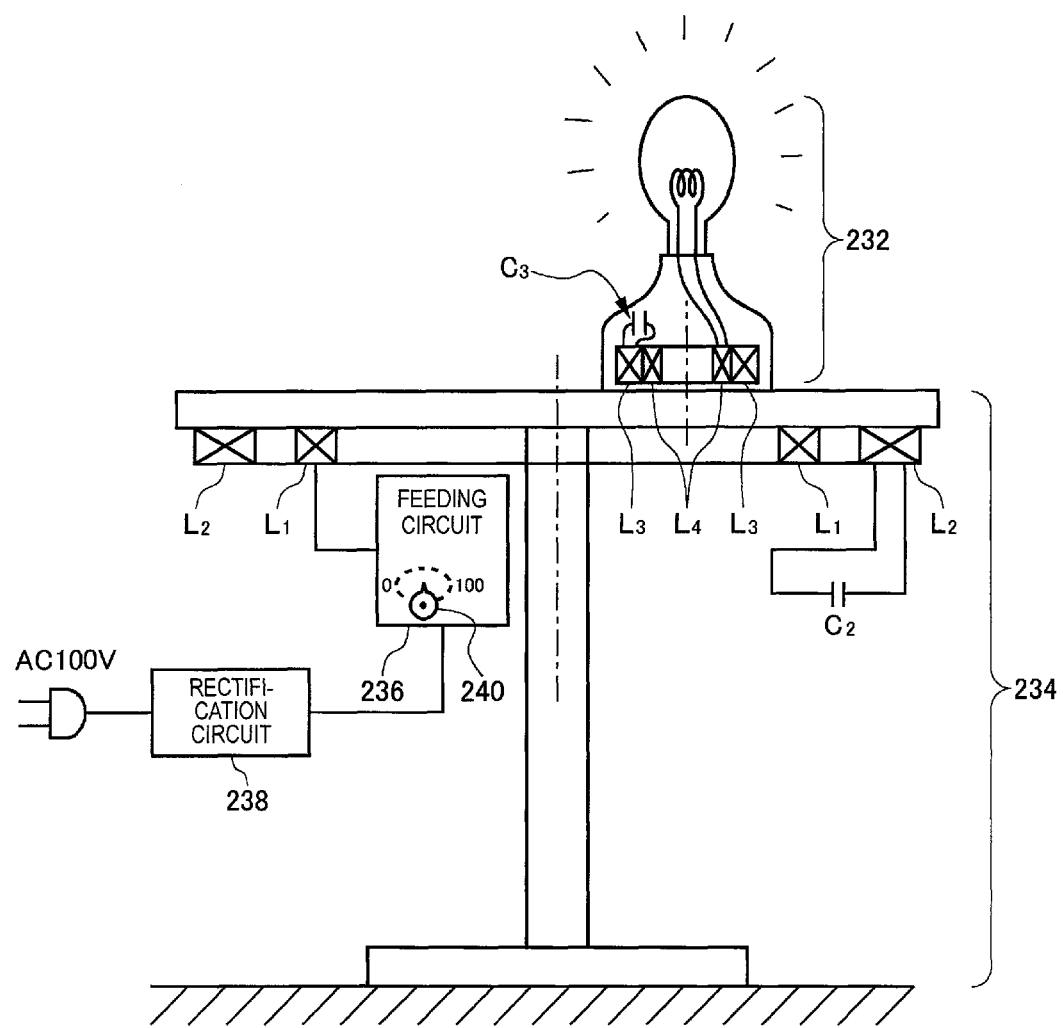
FIG. 5 is a side view of a table and a table lamp realized by using the wireless power feeding system.

FIG. 5 is a side view of a table 234 and a table lamp 232 realized by using the wireless power feeding system 100. The table 234 functions as the abovementioned wireless power feeder 116. A feeding coil L2 is wound on the rear side of the table 234, and an exciting coil L1 is wound inside the feeding coil L2 concentrically with the feeding coil L2. The feeding coil L2 is connected to a capacitor C2 to constitute a feeding coil circuit 120. The feeding coil circuit 120 may be installed on the rear side of the table plate as a whole or housed inside the table plate.

The exciting coil L1 is connected to a feeding circuit 236. The feeding circuit 236 is a circuit including a power transmission control circuit 200 and an enable signal generation circuit 220 and can change the level of an S2 signal (reference signal) by means of an adjustment dial 240. In other words, power control can be achieved by means of the adjustment dial 240. The feeding circuit 236 is connected a commercial AC power supply through the rectification circuit 238. AC voltage of the commercial AC power supply is converted into DC voltage by the rectification circuit 238 and is supplied as a power supply Vdd for the feeding circuit 236.

The table lamp 232 has inside thereof a wireless power receiver 118. A receiving coil L3 is wound in the lower portion of the table lamp 232, and a loading coil L4 is wound inside the receiving coil L3 concentrically with the receiving coil L3. A capacitor C3 is connected to the receiving coil L3 to constitute a receiving coil circuit 130. The lamp is connected to the loading coil L4 as a load LD. This lamp may turn on by receiving AC current. Further, AC current I4 flowing in the loading coil L4 may be converted into DC current by a not illustrated rectification circuit for supply to the lamp.

The table 234 feeds power to the table lamp 232 by wireless. Thus, a power cord is not required for the table lamp 232. The brightness of the table lamp 232 is adjusted by the table 234 side using the adjustment dial 240.

Figure 6:
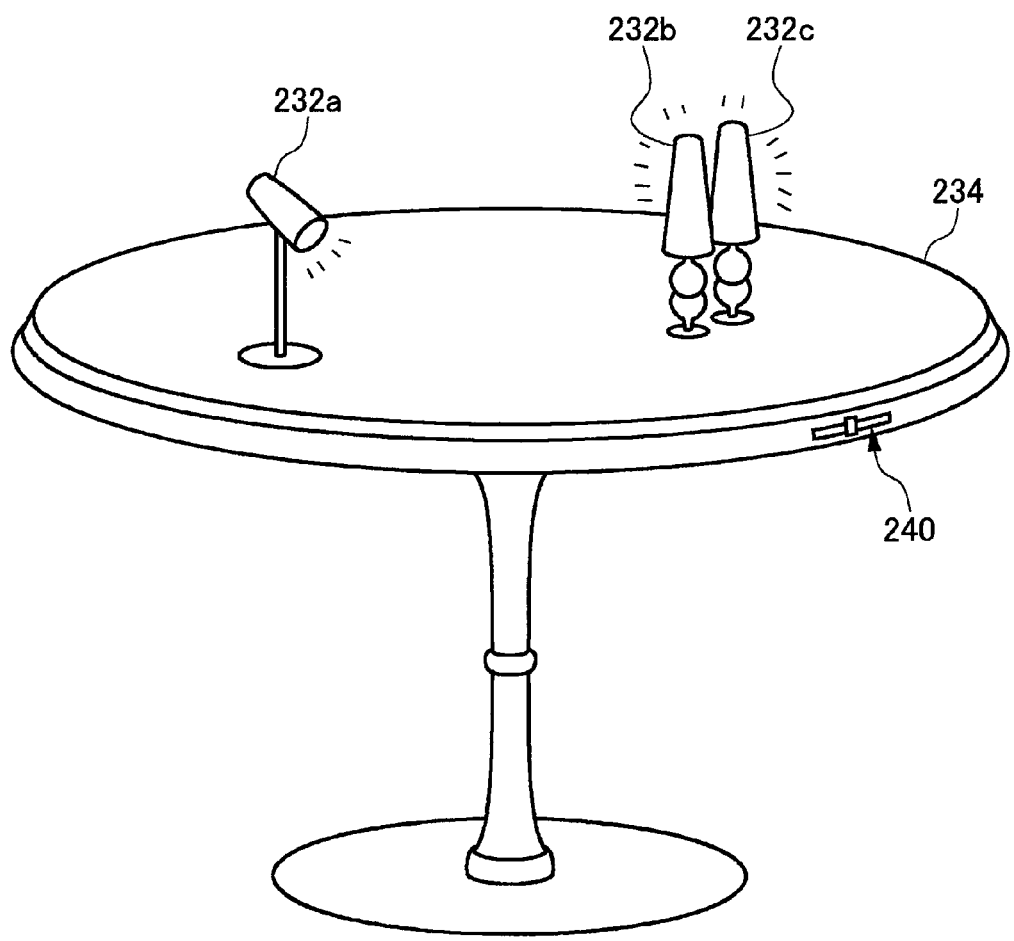
FIG. 6 is a view illustrating the outer appearances of the table and table lamp.

FIG. 6 is a view illustrating the outer appearances of the table 234 and table lamp 232. As illustrated in FIG. 6, the table 234 may incorporate the coils, feeding circuit 236, and the like. Further, the adjustment dial 240 may be provided on the side surface or top of the table 234. In the example of FIG. 6, three table lamps 232a, 232b, and 232c are placed on the top of the table 234. Since power cords are not required, it is possible to keep the top of the table 234 neat and tidy even in the case where a plurality of table lamps 232 are placed on the table 234. Further, the plurality of table lamps 232 can freely be laid out. Further, this configuration is excellent not only in terms of aesthetic purpose but in terms of safety. For example, there is no risk of stumbling over the power cord. Furthermore, the plurality of table lamps 232 can collectively be controlled by means of the adjustment dial 240, improving convenience.

Figure 7:
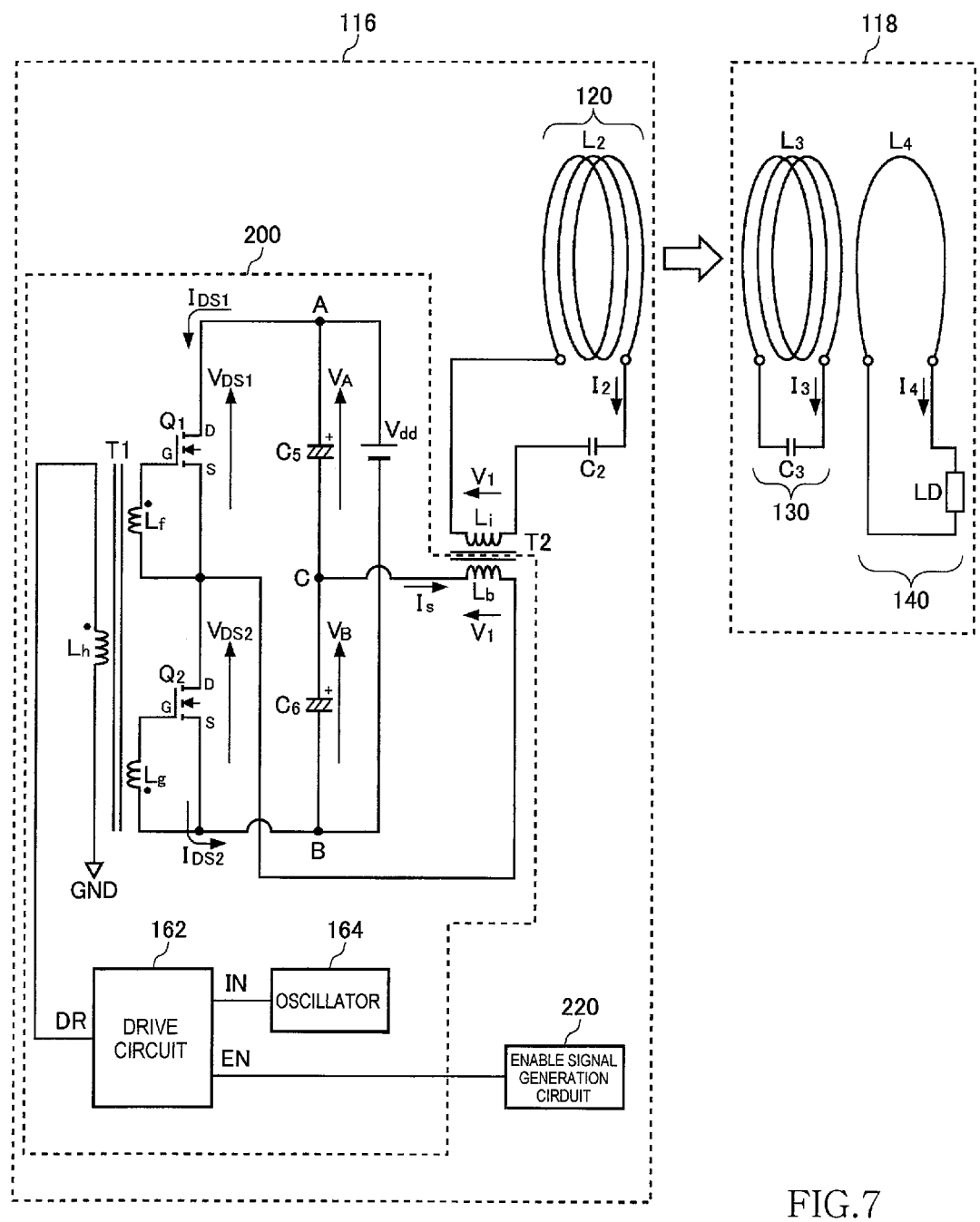
FIG. 7 is a system configuration view of a modification of the wireless power transmission system.

FIG. 7 is a system configuration view of a wireless power transmission system 100 which is a modification of the present embodiment. In the wireless power transmission system 100 of the modification, the power transmission control circuit 200 directly drives the feeding coil circuit 120 without intervention of the exciting circuit 110. Components designated by the same reference numerals as those of FIG. 1 have the same or corresponding functions as those in FIG. 1.

The feeding coil circuit 120 in the modification is a circuit in which the transformer T2 secondary coil Li is connected in series to the feeding coil L2 and capacitor C2. The transformer T2 secondary coil Li constitutes a coupling transformer T2 together with the transformer T2 primary coil Lb and receives AC power from the power transmission control circuit 200 by electromagnetic induction. Thus, the AC power may be directly fed from the power transmission control circuit 200 to the feeding coil circuit 120 without intervention of the exciting circuit 110.

The wireless power transmission system 100 has been described above based on the preferred embodiment. By controlling the duty ratio between the enable period and disable period, it is possible to arbitrarily change transmission power while maintaining a resonance state. Further, a system that controls the time-average value of transmission power is adopted, so that power loss hardly occurs. Further, the drive circuit 162, oscillator 164, and enable signal generation circuit 220 are each formed in a compact shape, so that the circuit scale of the power transmission control circuit 200 can easily be reduced.

In the case of a conventional table lamp, a power cord gets in the way, so that a pendant lamp is often used for a dining table. According to the table 234 of the present invention, it is possible to eliminate the need of providing a power cord of the table lamp, thereby increasing availability of the table lamp 232. For example, there may be a case where food looks more attractive under illumination of the table lamp. Further, the illumination location is fixed in the case of the pendant lamp, while the table lamp 232 can freely be laid out, enabling various forms of illumination. In addition, a plurality of table lamps 232 can collectively be controlled by the table 234 side.

The above embodiments are merely illustrative of the present invention and it will be appreciated by those skilled in the art that various modifications may be made to the components of the present invention and a combination of processing processes and that the modifications are included in the present invention.

Although the power transmission control circuit 200 is formed as a half-bridge type circuit in the above embodiment, the power transmission control circuit 200 may be formed as a push-pull type circuit. The S1 signal (control signal) that the enable signal generation circuit 220 generates may be an AC signal having not only a saw-tooth waveform but also a triangle wave or a sine wave in which a voltage value is gradually increased or decreased within a predetermined time period.

What is claimed is:

1. A wireless power feeder for feeding power by wireless from a feeding coil to a receiving coil at the resonance frequency of the feeding coil and receiving coil, comprising:
 a power transmission control circuit that feeds AC power to the feeding coil at the resonance frequency;

a feeding coil circuit that includes the feeding coil and a capacitor and resonates at the resonance frequency;

a control signal generation circuit that generates a control signal having a control frequency lower than the resonance frequency; and a comparison circuit that generates an enable signal when a predetermined magnitude relationship is established between the level of the control signal and that of a reference signal, wherein the power transmission control circuit feeds the AC power to the feeding coil under only while the enable signal is being generated.

2. The wireless power feeder according to claim 1, wherein the control signal generation circuit generates a signal having a saw-tooth waveform as the control signal.

3. The wireless power feeder according to claim 1, further comprising a reference signal adjustment circuit for adjusting the level of the reference signal.

4. The wireless power feeder according to claim 1, further comprising an exciting coil that is magnetically coupled to the feeding coil and feeds AC power fed from the power transmission control circuit to the feeding coil, wherein the power transmission control circuit includes first and second current paths and makes first and second switches connected in series respectively to the first and second current paths alternately conductive to feed the AC power to the exciting coil.

5. A wireless power transmission system comprising:

the wireless power feeder as claimed in claim 1;

the receiving coil; and a loading coil that is magnetically coupled to the receiving coil and receives power that the receiving coil has received from the feeding coil.

6. A table with wireless power feeding function comprising the wireless power feeder as claimed in claim 1, wherein the feeding coil is provided on the rear surface of the table or incorporated inside the table.

\* \* \* \* \*